June 23, 1931. H. J. ROUND 1,811,095
THERMIONIC AMPLIFIER AND DETECTOR
Original Filed Sept. 13, 1920 2 Sheets-Sheet 1
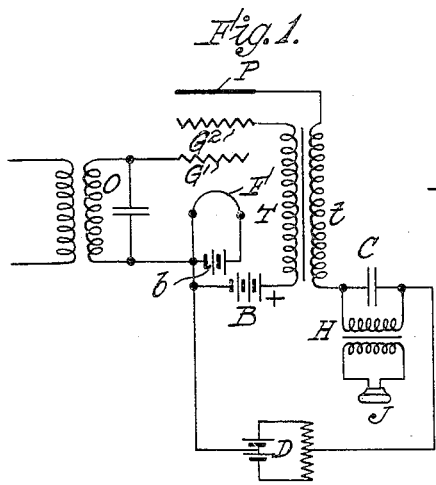
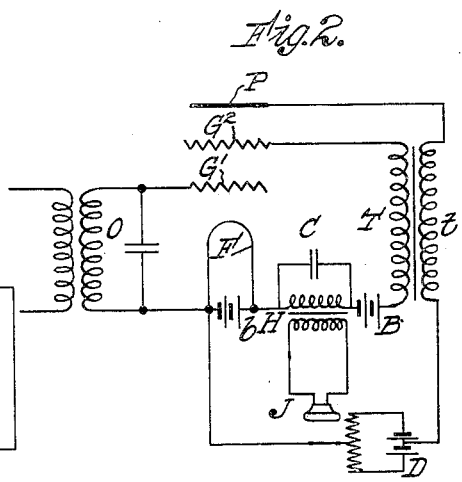
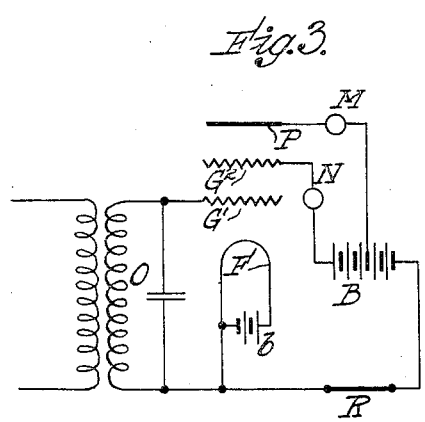
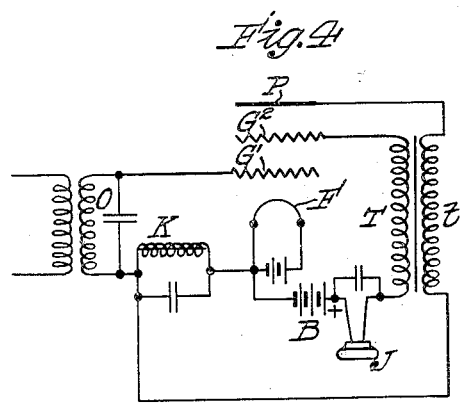
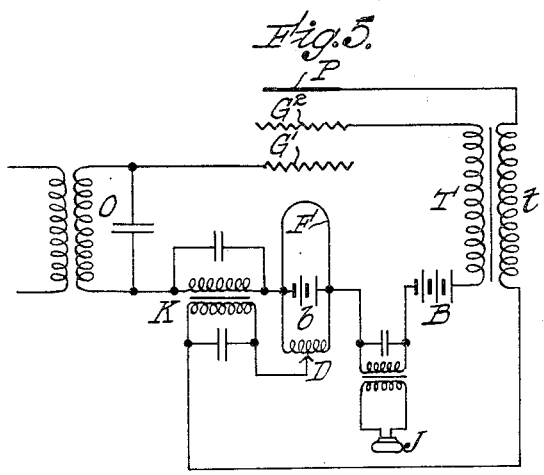
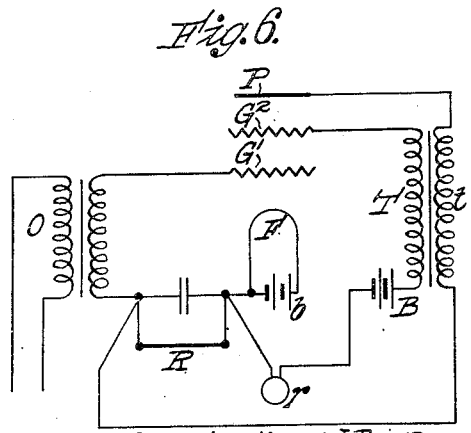
Inventor Henry J. Round
Attorney Ira J. Adams

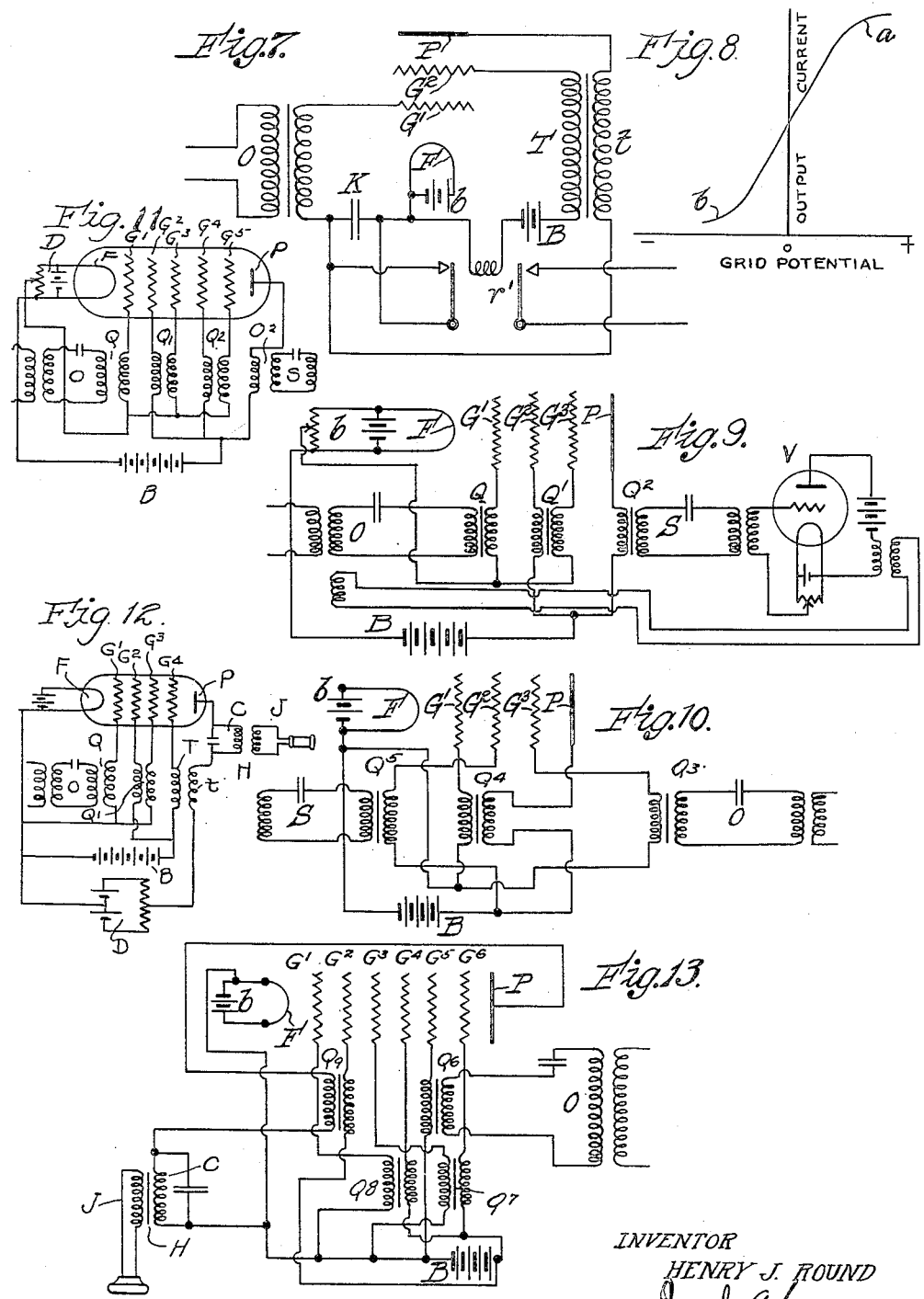

Patented June 23, 1931

1,811,095

UNITED STATES PATENT OFFICE

HENRY JOSEPH ROUND, OF MUSWELL HILL, LONDON, ENGLAND, ASSIGNOR TO RADIO CORPORATION OF AMERICA, OF NEW YORK, N. Y., A CORPORATION OF DELAWARE

THERMIONIC AMPLIFIER AND DETECTOR

Application filed September 13, 1920, Serial No. 410,025, and in Great Britain December 9, 1919.
Renewed August 27, 1930.

This invention relates to improvements in thermionic amplifiers of electrical oscillations.

According to this invention I employ a thermionic device or valve having more than three electrodes in such a way that with one valve I can obtain both rectification and amplification or multiple amplification with or without rectification.

According to one form of my invention I employ a valve having in it a filament, a grid next to or surrounding the filament, a second grid beyond the first and a plate or anode beyond the second grid; I connect the second grid through one winding of a transformer to the positive pole of a battery, the negative pole of which is connected to the filament, I connect the plate through the second winding of the transformer to the filament and I connect the circuit in which are the oscillations to be magnified to the first grid and filament. With this arrangement oscillations in the first grid-filament circuit are amplified in the second grid-filament circuit and the second grid and plate act as a rectifier.

My invention is illustrated in the accompanying drawings, in which Figs. 1 to 7 are diagrammatic representations of circuits containing a valve having two grids for carrying out the invention; Fig. 8 is a curve showing the grid voltage-plate current characteristic of a thermionic device; Figs. 9 and 10 are modifications using tubes having three grids; Fig. 11 is a modification using a five grid tube; Fig. 12 is a modification using a four grid tube; and Fig. 13 is a modification using a six grid tube.

In the arrangement shown in Figure 1 a circuit O into which high frequency alternating current may be introduced is connected as shown to the first grid G1 and to, say, the negative end of the filament heating battery $b$.

A high frequency transformer T $t$ has its primary winding T connected to the second grid G2 and to a high tension battery B. The plate P is connected through the secondary $t$ to a point on the battery $b$ near its negative end and a potentiometer D is inserted in that connection. The current-voltage curve between the current in D $t$ P and the voltage applied by D is of the well known saturation rectifying shape with two rectifying points $a$ and $b$ near the upper and lower knees of the curve shown in Fig. 8. Thus the magnified currents can be rectified by appropriate adjustment of the potentiometer D and I can insert a telephone attachment C H J in series with the transformer secondary $t$.

By the use of the potentiometer D either a rectifying point or a midway point may be used, say, to produce any of the well known effects.

When the plate P takes electrons there will be a drop in the current in the circuit G2 T B seeing that the emission current from the filament is not essentially influenced by the fact of electrons reaching P or from failure so to do. The telephone connection may therefore be made in the circuit G2 T F as shown in Figure 2 and this will give as good results as the arrangement shown in Figure 1, in fact slightly better owing to the fact that the circuit F G1 G2 itself is a partial rectifier, and this rectification is added to that produced by the second grid and plate. The connections are arranged so that these effects are additive.

By an arrangement such as is shown in Figure 3 with a high resistance R in the plate-filament and second grid-filament circuits, I can avoid the use of the transformer T $t$. The currents in the circuit G2 R F will cause differences of potential between the ends of the high resistance R and these differences combining with the potential of the part of battery B, which is included in the circuit P B R F, will give such a resulting potential on plate P as to give rise to low frequency currents in that circuit and these currents can be detected in a telephone attached at the point M. The plate circuit and the second grid (G2) circuit are thus coupled through the resistance R. Low frequency currents will also be caused in the circuit G2 R F, so that a telephone attachment can be inserted at the point N in place of at the point M.

In addition to this rectification a further improvement can be made by taking the resulting musical note obtained by rectification of the high frequency and retransmitting this through the valve circuit for magnification. Figure 4 shows this circuit in which K can be a choke coil or a resistance. Or K may be arranged as a transformer as shown in Figure 5 so that the potentiometer D may be used to adjust the potential of P. These circuits are useful in slightly different circumstances, e. g. for recording signals or relay working, and in this connection the transformer is usually replaced by a resistance R, the telephone being replaced by a relay r and usually O and T t will be transformers for low frequency, although this is not necessary (see Figure 6).

Also K can be replaced by the contacts of the relay. This is shown in Figure 7 where the action is somewhat as follows:—

A low frequency alternating current enters at O, is magnified to the low frequency transformer T and rectified by P. The rectified current, i. e. a negative charge, then charges condenser K and consequently grid G1. This has the effect of reducing or stopping the current flowing through the relay r'. The contact on the left is then closed because the relay becomes demagnetized, K is discharged and then the relay comes into action again and opens the contact on the left. The contact on the right is used for working any other apparatus desired.

In another form of my invention I employ a series of grids and I couple the second to the third by a transformer and if there be more than three grids I couple also the fourth grid to the fifth by a transformer, the second grid and the fourth grid also being given a positive potential with relation to the filament.

In Figure 9 the circuit O is coupled through a transformer Q to the first grid G1; the second grid G2 is connected to the positive pole of B and is coupled by a transformer Q1 to the third grid G3, while P is connected to G2 and is coupled to an output circuit S.

This arrangement may be operated in various ways. The grid G' may be operated on the slope of the characteristic curve to obtain amplification without substantial rectification. The currents of the input circuit F, Q, G1, are amplifed in the output circuit F, B, Q', G2. A second amplification may be obtained with or without rectification, depending on whether the grid G3 is operated on the knee or the slope of the curve, by the effect of the current in the input circuit F, Q', G3, on the output circuit F, B, Q2, P. The output of circuit G may then be rectified if this has not been done by means of a valve V and the output of this valve twice amplified in the first valve by feeding the rectified current back to the first valve.

Figure 10 shows the use of a valve with three grids, but the magnification takes place backwards. The circuit O being coupled through transformer Q3 to the grid G3 nearest to the plate P which is coupled through transformer Q4 to grid G1. Grid G2 which is connected to the battery B is coupled through transformer Q5 to the output circuit S. The circuit of Fig. 10 operates in a similar manner to Fig. 9, but in the reverse direction. The input at O into circuit F, Q3, G3, modifies the current of the output circuit F, B, Q4, P. The input circuit F, Q4, G' coupled to F, B, Q4, P, similarly modifies the currents of the output circuit F, B, Q5, G2, which is coupled to circuit S. In Fig. 11 a five grid modification similar to Fig. 9 is shown in which the additional grid G4 is connected to battery B and coupled through transformer Q to grid G5, which is connected to the filament.

To the three grid modification connected substantially as in Fig. 9, I may add rectification to the magnification processes as in Figs. 1 to 5, by adding a grid G4; as illustrated in Fig. 12 the grid G4 is connected as in Fig. 1 to the battery B through the coil T of transformer T t. The plate P is connected through coil t, telephone attachment C H J, and potentiometer D to the filament.

Figure 13 shows an arrangement somewhat similar to that of Figure 10, but with an even number of grids. Here magnification takes place backwards and there is rectification. The six grids G1, G2, G3, G4, G5, G6, and plate P are connected as follows: G1, G3, G5, and plate P to the filament, and G2, G4, and G6 to the battery B. Input circuit O is coupled through transformer Q6 to G5; G6 to G3 through transformer Q7; G4 to G1, through transformer Q8, and G2 to the plate circuit P, which contains the telephone circuit C H J, through transformer Q9. The operation is similar to Fig. 1 but adds further stages of amplification. The input to G5 is amplified in F, G6; the input of F, G3, which is coupled to F, G6, is amplified in F, G4; the input of F, G1 is amplified in F, G2, and the output of F, G2, is rectified in the plate circuit F, P.

Magnification forward through the valve with an even number of grids is not shown as this follows from Figure 7. Also arrangements giving double magnification can be made as described above with reference to two grid valves.

What I claim is:—

1. The method of obtaining amplification of electric oscillations in a single tube which consists in impressing the oscillations between one electrode and a cathode of a thermionic device causing said impressed oscillations to influence the electronic flow to a second electrode having a relatively high potential with respect to said cathode and inductively coupling said second electrode to a third electrode to produce amplified oscillations.

2. The method of obtaining amplification of electric oscillations in a single tube which consists in impressing oscillations across a cathode and an electrode, causing said oscillations to influence the electronic flow to a second electrode, and inductively coupling said electrode so as to impress said oscillations between a third electrode and said cathode to produce amplified oscillations.

3. The method of obtaining amplification of electric oscillations with a single tube which consists in impressing the oscillations on the cathode electrode circuit, causing said oscillations to influence the electronic flow in the cathode plate electrode circuit, inductively coupling said cathode plate circuit to cause the variable currents due to the influenced electronic flow to react on another circuit containing said cathode and a third electrode to produce amplified oscillations.

4. The method as defined in claim 3 further characterized by causing the amplified currents from the plate cathode circuit to react on a fourth electrode to produce further amplification and then rectifying the last mentioned currents.

5. The method of obtaining amplification of electric oscillations within a single thermionic tube having in it an electron emitting cathode and a plurality of cold electrodes, which consists, in successively impressing oscillations on different cold electrodes, in causing the oscillations impressed to influence the electronic flow to other cold electrodes, and in successively amplifying the oscillations in said tube through a plurality of amplification steps.

6. An amplifier comprising a tube, said tube enclosing a cathode, a plurality of control electrodes, and a plate electrode, and means for coupling the plate cathode circuit to alternate control electrodes and the cathode member successively to produce amplification through said coupling.

7. An amplifier comprising a cathode, a plate, a plurality of cold electrodes positioned between said cathode and plate, said electrodes being arranged to serve alternately as input and output electrodes, and coupling means for connecting each output electrode circuit to each succeeding input electrode circuit in cascade.

8. An amplifier comprising a tube enclosing a cathode, an anode, and a plurality of cold electrodes positioned between said anode and cathode, said electrodes being arranged to serve alternately as input and output electrodes and coupling means for connecting the output circuit of said tube to said cathode and each succeeding controlling electrode in a manner to cause amplification.

9. An amplifier for electrical oscillations comprising a bulb enclosing an electron emitting cathode, an anode, and a plurality of cold electrodes between said cathode and anode, means for applying oscillations to one of the cold electrodes, means for coupling two of the other cold electrodes together, and means for coupling a second pair of said cold electrodes together, said couplings being adapted to provide a plurality of amplifying circuits within said bulb.

10. An amplifier for electrical oscillations comprising a bulb, an electron emitting cathode, and a plurality of cold electrodes therein, means for applying oscillations to one of the cold electrodes, means for inductively coupling two of the other cold electrodes together, means for coupling a second pair of said cold electrodes together, and a receiver associated with one of the cold electrodes.

11. An amplifier for electrical oscillations comprising a bulb, an electron emitting cathode, and a plurality of cold electrodes including an intermediate electrode therein said electrodes being spaced at different distances from said cathode, a battery having one end connected to the cathode and the other connected to said intermediate cold electrode, the cold electrodes adjacent to said intermediate electrode each being connected to the cathode through a coupling coil adapted to couple said electrode to the preceding electrode.

12. An amplifier for electrical oscillations comprising a bulb, an electron emitting cathode, and a plurality of cold electrodes including an intermediate electrode therein, a battery having one end connected to the cathode and the other connected to an intermediate cold electrode, the cold electrodes adjacent to said intermediate electrode each being connected to the cathode through a separate coupling coil, one of said coils being coupled to the intermediate cold electrode.

13. In combination in a high frequency receiving system of an electron discharge tube having cathode, control grid and anode electrodes, a plurality of auxiliary electrodes disposed between the control grid and the anode electrode, said auxiliary electrodes being biased to different potentials.

14. In combination in a high frequency receiving circuit system, an electron discharge tube having cathode, control grid and anode electrodes, two auxiliary electrodes disposed between said control grid and the anode electrode, and one of said auxiliary electrodes being connected to said cathode.

15. In a receiving circuit, a discharge tube provided with cathode, control grid and anode electrodes, two auxiliary electrodes disposed between said control grid and the anode electrode, one of said auxiliary electrodes being adjacent the anode and electrically connected to the cathode.

16. In combination, in an electrical circuit, an electron discharge tube having a cathode and an anode, a control electrode connected to the cathode, an auxiliary electrode disposed between said control electrode and said anode and having a potential relatively higher than that of the cathode, and an additional electrode disposed between said auxiliary electrode and said anode, said additional electrode being electrically connected to said cathode.

17. In combination, in an electrical circuit, an electron discharge tube having a cathode and an anode, a control electrode connected to the cathode, an auxiliary electrode disposed between said control electrode and said anode and having a potential relatively higher than that of the cathode, and an additional electrode disposed between said auxiliary electrode and said anode, said additional electrode being electrically connected to said cathode, and having a direct current potential lower than the direct current potential of the anode.

18. In combination, in an electrical circuit, an electron discharge tube having a cathode and an anode, a control electrode connected to the cathode, an auxiliary electrode disposed between said control electrode and said anode and having a potential relatively higher than that of the cathode, and an additional electrode disposed between said auxiliary electrode and said anode, said additional electrode being electrically connected to said cathode, and having a direct current potential lower than the direct current potential in the anode and auxiliary electrode.

19. In a space discharge device in combination, a cathode and a control electrode both connected to an input circuit, an anode connected to an output circuit, an auxiliary electrode disposed between said control electrode and said anode, the potential of said auxiliary electrode being relatively more positive than that of the cathode, and an additional electrode disposed between the auxiliary electrode and the anode and being directly connected to the cathode.

20. An amplifier for electrical oscillations comprising an evacuated envelope, said envelope containing an electron emitting cathode, an anode and a control electrode, an auxiliary electrode disposed between said control electrode and said anode, and an additional electrode disposed between said anode and said control electrode, said additional electrode being directly connected to said cathode.

21. An amplifier for electrical oscillations comprising an evacuated envelope, an electron emitting cathode disposed therein, an anode, and at least three additional electrodes disposed in said envelope between said cathode and anode, one of said additional electrodes being a control electrode, and the remaining additional electrodes being disposed between said control electrode and said anode.

22. In combination in a discharge tube having cathode, control electrode and anode electrodes, two auxiliary electrodes disposed between the control grid and the anode electrode, the auxiliary electrode adjacent the cathode having a direct current potential not exceeding that of the anode and the other auxiliary electrode being directly connected to the cathode.

23. In combination with an electron discharge tube having cathode, control grid and anode electrodes, two auxiliary electrodes disposed between the control grid and the anode electrode, one of the auxiliary electrodes being adjacent the control electrode and having a potential substantially equal to that of the anode electrode, and the other auxiliary electrode being adjacent the anode and having a potential substantially equal to that of the cathode.

24. In combination with an electron discharge tube having cathode, control grid and anode electrodes, two auxiliary electrodes disposed between the control grid and the anode electrode, one of the auxiliary electrodes being adjacent the control electrode and having a potential substantially equal to that of the anode electrode, and the other auxiliary electrode being adjacent the anode and having a potential substantially equal to that of the cathode, said last mentioned auxiliary electrode being directly connected to the cathode.

In testimony that I claim the foregoing as my invention I have signed my name this twelfth day of August A. D. 1920.

HENRY JOSEPH ROUND.